United States Patent
Prampolini et al.

(10) Patent No.: US 8,439,661 B2
(45) Date of Patent: May 14, 2013

(54) POWER TAKE-OFF FOR COMPRESSORS

(75) Inventors: Silvano Prampolini, Bomporto (IT); Luca Munerati, Bondeno (IT)

(73) Assignee: Interpump Hydraulics S.p.A., Nonantola (IT)

( * ) Notice: Subject to any disclaimer, the term of this patent is extended or adjusted under 35 U.S.C. 154(b) by 832 days.

(21) Appl. No.: 12/629,227

(22) Filed: Dec. 2, 2009

(65) Prior Publication Data
US 2010/0154572 A1    Jun. 24, 2010

(30) Foreign Application Priority Data

Dec. 19, 2008   (IT) .............................. MO2008A0326

(51) Int. Cl.
*F01C 1/18*      (2006.01)
*F16H 37/00*     (2006.01)

(52) U.S. Cl.
USPC .................. 418/206.1; 418/206.7; 418/206.8; 74/11; 74/15.6

(58) Field of Classification Search .... 418/206.1–206.6, 418/206.7, 206.8; 74/11, 15.6, 15.86, 15.82, 74/15.8
See application file for complete search history.

(56) References Cited

U.S. PATENT DOCUMENTS

| | | | |
|---|---|---|---|
| 4,612,996 A * | 9/1986 | Wolf et al. ....................... | 172/26 |
| 5,228,355 A | 7/1993 | Smith et al. | |
| 5,249,474 A | 10/1993 | Gregory | |
| 6,396,173 B1 * | 5/2002 | Prampolini ................. | 310/12.19 |
| 7,070,036 B2 * | 7/2006 | Fernandez ................. | 192/109 R |
| 7,455,160 B2 | 11/2008 | Yamamoto et al. | |
| 7,673,534 B2 * | 3/2010 | Prampolini .................. | 74/15.86 |
| 2006/0157314 A1 | 7/2006 | Yamamoto et al. | |

FOREIGN PATENT DOCUMENTS

| | | |
|---|---|---|
| DE | 19955069 A1 | 5/2001 |
| EP | 1681484 A2 | 7/2006 |
| GB | 2261488 A | 5/1993 |

* cited by examiner

*Primary Examiner* — Hoang Nguyen
(74) *Attorney, Agent, or Firm* — Pearne & Gordon LLP

(57) ABSTRACT

A power take-off for compressors, comprising: a first rotating element (2), predisposed to be connected on command to a motor (40); at least a second rotating element (3), kinematically connected to the first rotating element (2), which is predisposed to be connected to a first user (50); a torque limiter or clutch (4), interposed between the first rotating element (2) and the second rotating element (3).

13 Claims, 2 Drawing Sheets

POWER TAKE-OFF FOR COMPRESSORS

BACKGROUND OF THE INVENTION

The present invention relates to a power take-off, in particular for industrial vehicles.

Power take-offs in industrial vehicles are usually applied directly to the gear change. They receive in input a torque of a certain rotation speed provided by the vehicle gearsn and transmit it in output, by means of special organs therefor, to one or more users. In particular the power take-offs exhibit a first output organ, to which an air compressor can be connected, and a second output organ, to which a pump or other hydraulic user can be connected. Both users can be connected directly to the power take-off.

Normally the velocity ratio between the power take-off and the drive shaft of the gears for use of the compressor is comprised between 1.4 and 1.8:1, while the ratio for the use of the hydraulic pump is comprised between 0.8 and 1.6:1. Both the users, compressor and pump, can be connected and disconnected to and from the output organ of the power take-off by means of special connector devices. Activation of the connector devices is normally pneumatic.

At present there do not exist large-size air compressors, i.e. able to process air flows in the order of 200-800 m³/hour, directly connectable to the power take-off fixed on the gear change of industrial vehicles. This is due to the high weight of the compressors, provided with a circuit and a lubrication pump, a torque limiter and a stage of reduction in input, which normally reaches 150 kg.

Large-size compressors are therefore connected to the frame of the vehicle by support brackets. Transmission of torque and rotating motion of the output organ of the power take-off to the compressor is achieved via a drive shaft. This leads to a certain complication in the compressor connection to the power take-off, as well as a further increase in the overall weight and mass of the power take-off and the compressor.

The aim of the present invention is to provide a light and compact power take-off which enables projecting connection of a user, in particular a compressor able to process flow-rates of the order of 200-800 m³/hour, without any need for brackets or other support means.

BRIEF DESCRIPTION OF THE DRAWINGS

Characteristics and advantages of the present invention will better emerge from the following description which is intended purely by way of non-limiting example of a non-exclusive preferred embodiment of the invention, illustrated in the accompanying figures of the drawings, in which.

DESCRIPTION OF THE PREFERRED EMBODIMENTS

Figure 1:
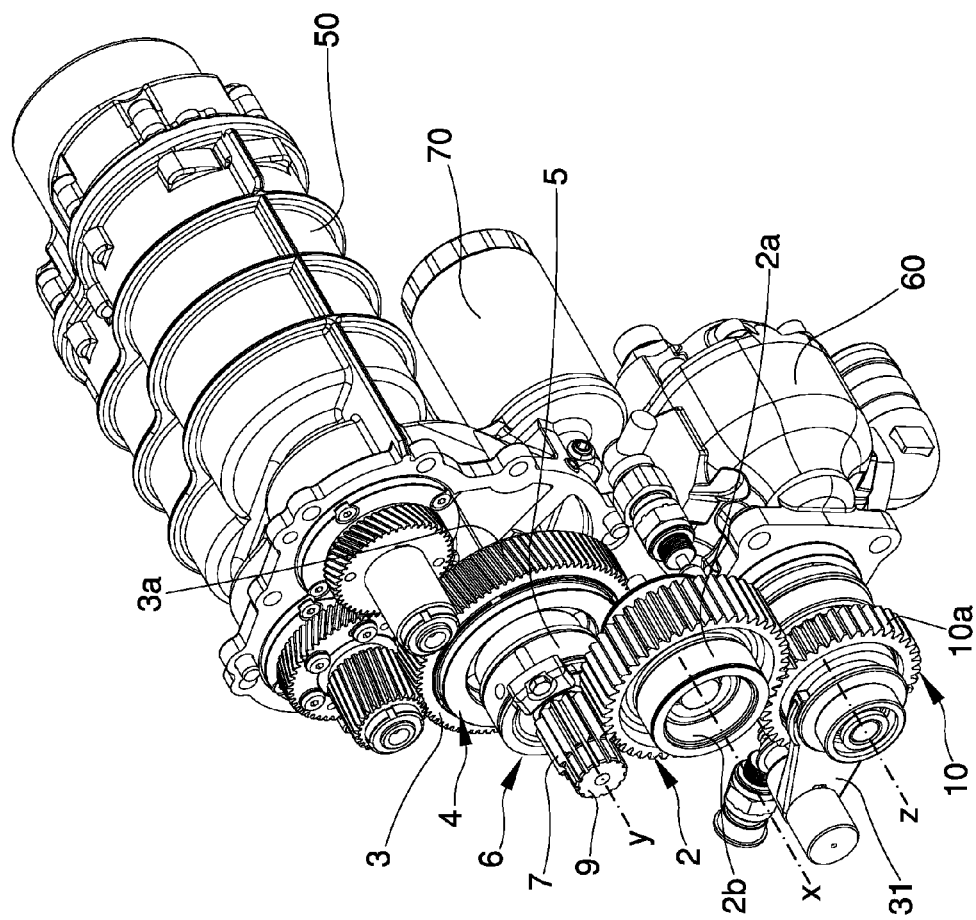
FIG. 1 is an axonometric view of the power take-off of the present invention, from a front right point of view, in which the power take-off is without the containing casing and connected to two users.

In the figures, the power take-off for compressors of the present invention is illustrated without the casing which, during working conditions, is present and covers all the components.

The power take-off for compressors of the present invention comprises a first rotating element 2, predisposed to be controlledly connected to a motor 40. In a preferred embodiment of the power take-off, the first rotating element 2 exhibits a rotation axis X and is provided with an external cogging 2a and an internal cogging 2b. The internal cogging 2b is predisposed to engage to a cogged organ of the motor 40 in order to receive there-from a drive torque. The first rotating element is slidable along the rotation axis X thereof between a non-operating position, in which the internal cogging 2b does not engage with the cogged organ of the motor 40, and an operating position, in which the internal cogging 2b can engage with the cogged organ of the motor 40. The power take-off is engaged by commanding the first rotating element 2 to assume the operating position. The displacement of the first rotating element can be actuated for example by means of a small hydraulic or pneumatic piston 30.

Figure 2:
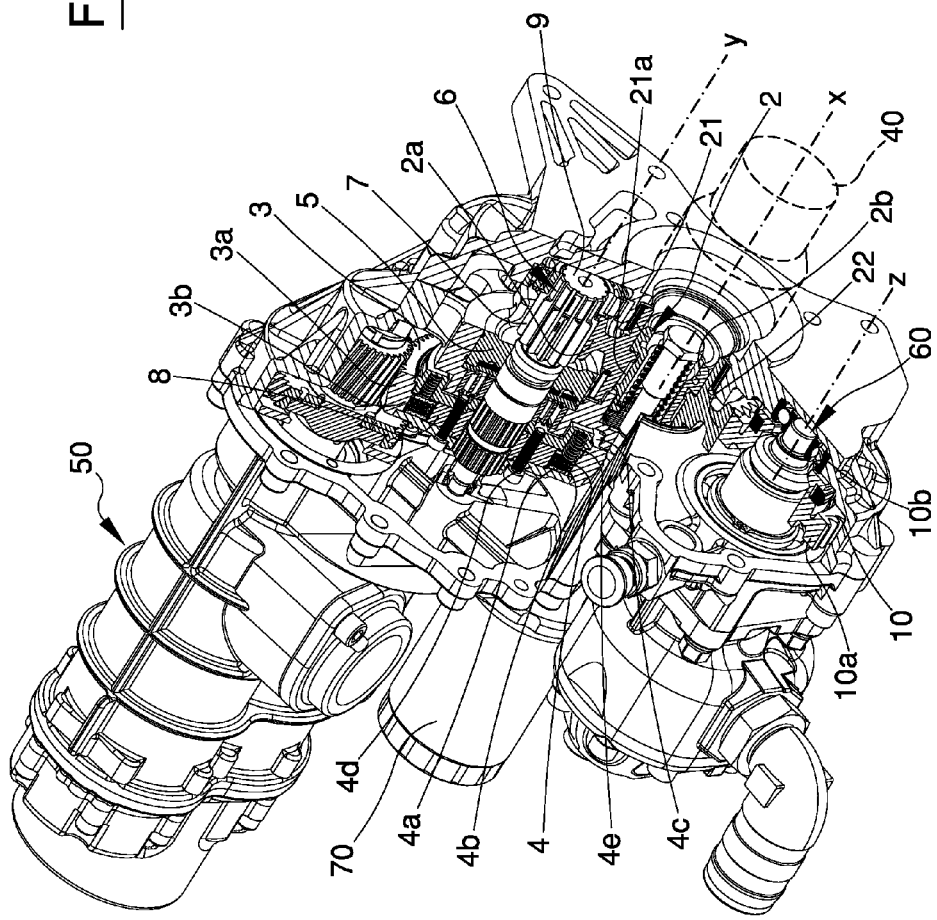
FIG. 2 is a second axonometric view of the power take-off of the present invention, from a front left point of view, in which the power take-off is partially illustrated.

As can be seen in FIG. 2, the first rotating element 2 is formed by a sleeve 21 and by a crown 22. At an end thereof the sleeve 21 exhibits the internal cogging 2b, while in an intermediate position thereof it exhibits an external cogging 21a. The crown 22 is arranged in a coaxial position to the sleeve 21 and exhibits an internal cogging 22a which enmeshes with the external cogging 21a of the sleeve 21 and the external cogging 2a. The sleeve 21 can slide along the rotation axis X thereof, being arranged on command in the operating position and the non-operating position, while the crown 22 remains stationary. The external cogging 21a of the sleeve 21 and the internal cogging 22a of the crown 22 can slide one against the other, staying enmeshed as they do so.

The power take-off further comprises at least a second rotating element 3, kinematically connected to the first rotating element 2, which is predisposed to be connected to a first user 50. The second rotating element 3 preferably exhibits a cogging 3a which is predisposed to engage with a cogged organ of the first user 50, such as to be able to transmit to the first user 50 the torque received from the first rotating element 2. The first user 50 can be for example a screw compressor, illustrated only schematically in the accompanying figures of the drawings.

The first 2 and the second rotating element 3 are connected by means of a third rotating element 6 which realises a predetermined transmission ratio between the first 2 and the second 3 rotating element. The third rotating element 6 preferably comprises a first cogged wheel 7, which enmeshes with the external cogging 2a of the first rotating element 2, and at least a second cogged wheel 8, which enmeshes with the external cogging 3a of the second rotating element 3. The third rotating element 6 further comprises a shaft 9 which connects the first and the second cogged wheel 7, 8 solidly in rotation about an axis Y.

The power take-off of the present invention further comprises a torque limiter or a clutch 4, interposed between the first 2 and the second 3 rotating element. In particular the torque limiter 4 is interposed between the second cogged wheel 8 and the second rotating element 3.

The torque limiter 4 comprises a plurality of cogged rings 4a, 4b arranged in a pack-fashion coaxially of the second cogged wheel 8 and the second rotating element 3. A part 4a of the cogged rings exhibits an external cogging which enmeshes with an internal cogging 3b of the second rotating element 3. The remaining cogged rings 3b exhibit an internal cogging which enmeshes with the second cogged wheel 8 and are alternated with the cogged rings 4a provided with external cogging. The cogged rings are comprised between two counter-posed discs 4c, 4d and are pressed into reciprocal contact by means of a plurality of helical springs 4e interposed between a first disc 4c and the pack of the cogged rings 4a, 4b. The maximum transmittable torque of the torque limiter 4 depends on the friction force generated between the cogged rings 4a, 4b by effect of the thrust exerted by the springs 4e.

The power take-off can be further provided with a pump 5, kinematically connected to the first rotating element 2, which is predisposed to send a lubricating fluid to the first user 50. The pump 5 is preferably a lobe pump provided with a rotor, not illustrated in detail as it is a known component, which is solidly constrained to the third rotating element 6 in rotation about the axis Y. In particular, the pump 5 is coaxially associated to the shaft 9 in an intermediate position between the first and the second cogged wheel 7, 8.

The pump 5 is predisposed to receive a lubricating fluid directly from the motor 40, through a specially-disposed conduit, and to send the lubricating fluid to the first user 50 by means of a passage afforded through the shaft 9. A filter 70 is predisposed between the pump 5 and the first user 50 in order to ensure a correct degree of purification of the lubricating fluid before inlet to the first user 50.

The power take-off can further be provided with a fourth rotating element 10, kinematically connected to the first rotating element 2, which is predisposed to be connected on command, by means of a hydraulic or pneumatic cursor 31, to a second user 60, for example a pump. The fourth rotating element 60 can rotate about a third axis Z which is parallel to the preceding rotation axes X, Y. The fourth rotating element 60 exhibits an external cogging 10a, which enmeshes with the external cogging 2a of the first rotating element 2, and an internal cogging 10b, predisposed to enmesh with a cogged element (not illustrated) of the second user 60.

All the components which rotate with respect to the casing (not illustrated) of the power take-off, or with respect to other fixed parts, are provided with bearings or roller bushes which have not been cited and described explicitly as they are of absolutely known type, and their positioning is easily intuitable by a technical expert in the sector.

The power take-off of the present invention provides important advantages. It is compact and light and can be connected projectingly to a drive shaft. As it is already provided with a gear reducer, torque limiter and lubrication pump for a user, it enables the use of users such as compressors or pumps which are very light and compact, and which in turn can be projectingly connected to the power take-off.

The invention claimed is:

1. A power take-off for compressors, wherein the power take-off comprises: a first rotating element, predisposed to be connected on command to a motor; at least a second rotating element, kinematically connected to the first rotating element, which is predisposed to be connected to a first user; a torque limiter or clutch, interposed between the first rotating element and the second rotating element; and a pump, kinematically connected to the first rotating element, which pump is predisposed for sending a lubricating fluid to the first user.

2. The power take-off of claim 1, wherein the first rotating element and the second rotating element are connected by means of a third rotating element which realises a predetermined transmission ratio between the first rotating element and the second rotating element.

3. The power take-off of claim 2, wherein the third rotating element comprises a first cogged wheel, which enmeshes with the first rotating element, and at least a second cogged wheel, which enmeshes with the second rotating element.

4. The power take-off of claim 3, wherein the torque limiter is interposed between the second cogged wheel and the second rotating element.

5. The power take-off of claim 4, wherein the third rotating element comprises a shaft which connects the first cogged wheel and the second cogged wheel solidly in rotation about an axis.

6. The power take-off of claim 2, wherein the pump is a lobe pump provided with a rotor solidly constrained in rotation to the third rotating element.

7. The power take-off of claim 3, wherein the pump is a lobe pump provided with a rotor solidly constrained in rotation to the third rotating element, and wherein the pump is coaxially associated to a shaft in an intermediate position between the first cogged wheel and the second cogged wheel.

8. The power take-off of claim 7, comprising a filter, interposed between the pump and the first user.

9. The power take-off of claim 3, comprising a fourth rotating element, kinematically connected to the first rotating element, which is predisposed to be connected on command to a second user.

10. The power take-off of claim 1, wherein the first rotating element is provided with an external cogging, predisposed to engage with the second rotating element, and an internal cogging, predisposed to engage to a cogged organ of the motor, the first rotating element being slidable on command along the rotation axis thereof between a non-operating position, in which the internal cogging does not engage with the cogged organ of the motor, and an operating position, in which the internal cogging can engage with the cogged organ of the motor.

11. The power take-off of claim 10, wherein the first rotating element comprises: a sleeve which at an end thereof is provided with the internal cogging while in an intermediate portion it is provided with an external cogging; a crown, arranged in a coaxial position to the sleeve, which crown exhibits an internal cogging, predisposed to enmesh with the external cogging of the sleeve and the external cogging; the sleeve being slidable along the rotation axis thereof in order to be arranged, on command, in the operating position, in which the internal cogging does not engage with the cogged organ of the motor, and in the operating position, in which the internal cogging can engage with the cogged organ of the motor.

12. The power take-off of claim 1, wherein the pump is predisposed to receive a lubricating fluid directly from the motor.

13. The power take-off of claim 7, wherein the pump is predisposed to receive a lubricating fluid directly from the motor, through a conduit, and to send the lubricating fluid to the first user by means of a passage through the shaft.

* * * * *